Aug. 21, 1923.
J. A. HESS
1,465,434
FILE CUTTING MACHINE
Filed April 22, 1921      5 Sheets-Sheet 1
Fig. 1.
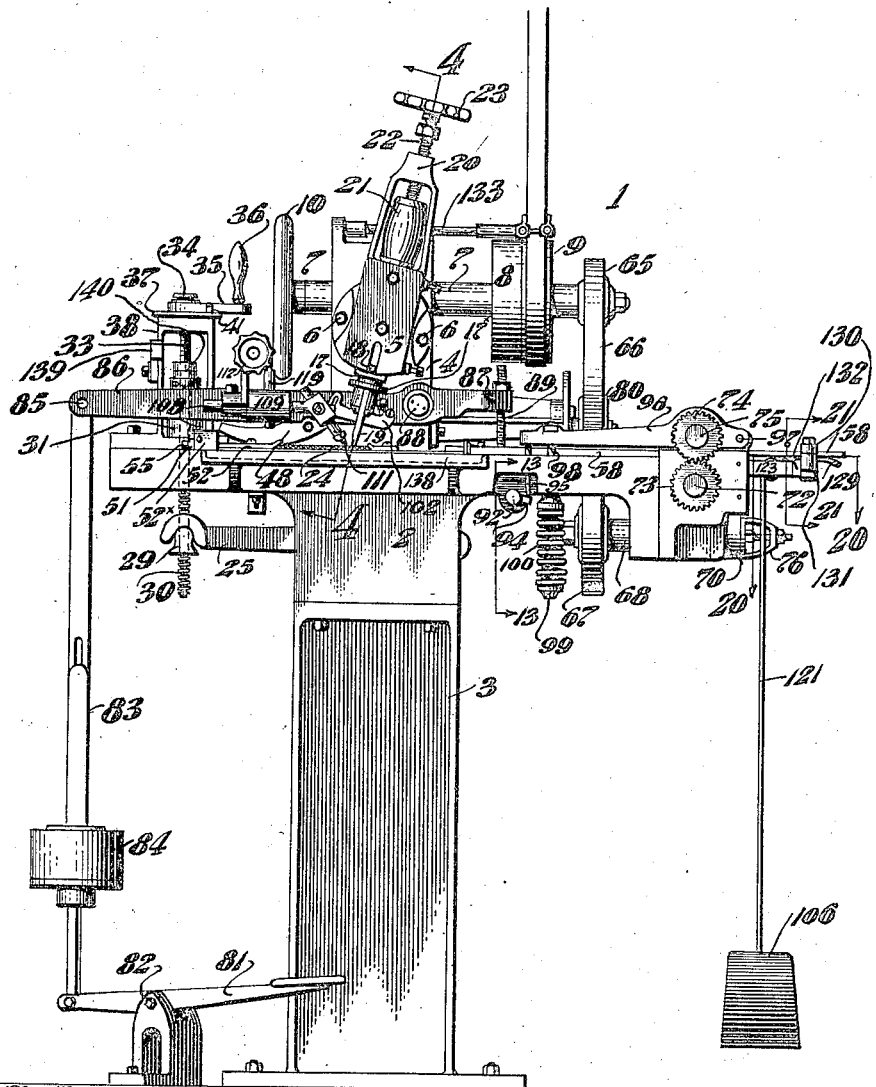
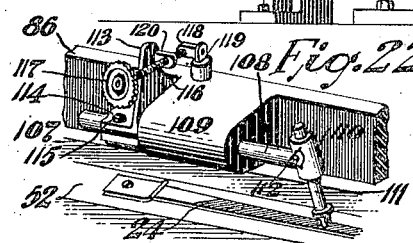
Fig. 22.
INVENTOR
John A. Hess,
BY
ATTORNEYS

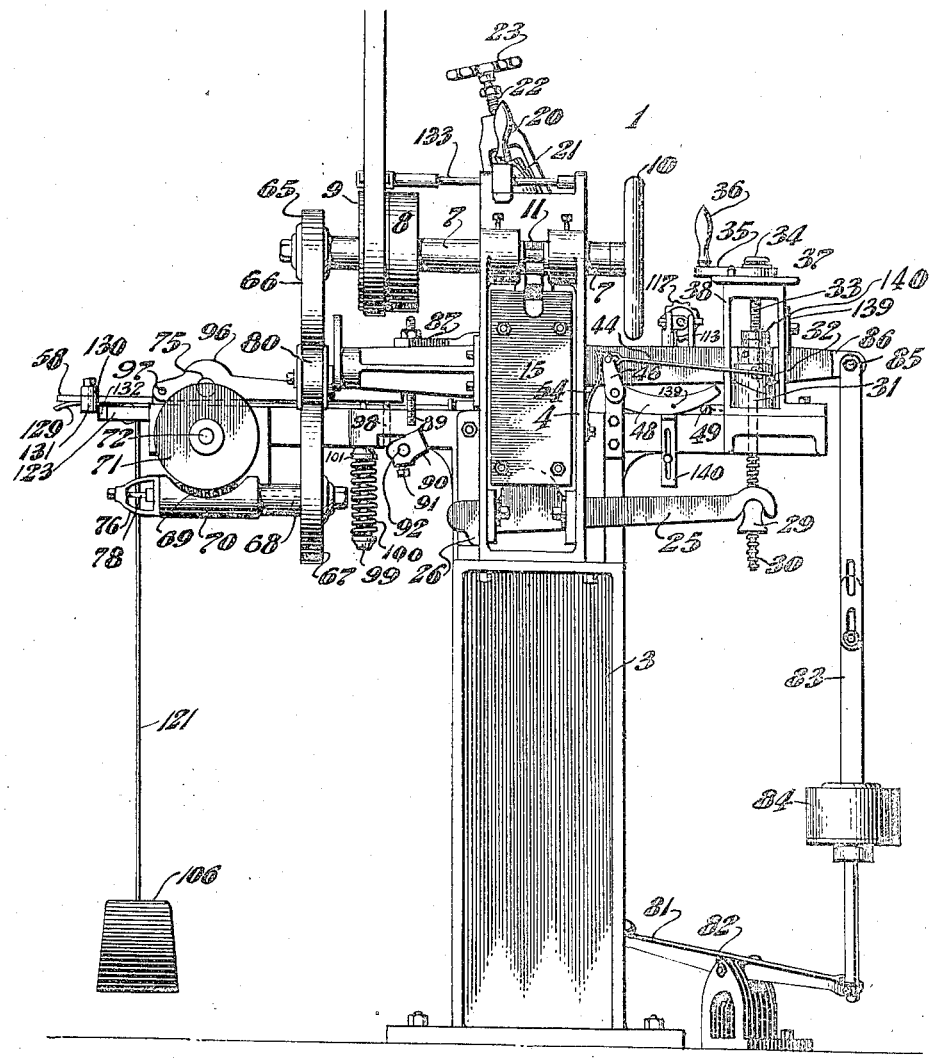

Aug. 21, 1923.
J. A. HESS
1,465,434
FILE CUTTING MACHINE
Filed April 22, 1921     5 Sheets—Sheet 3
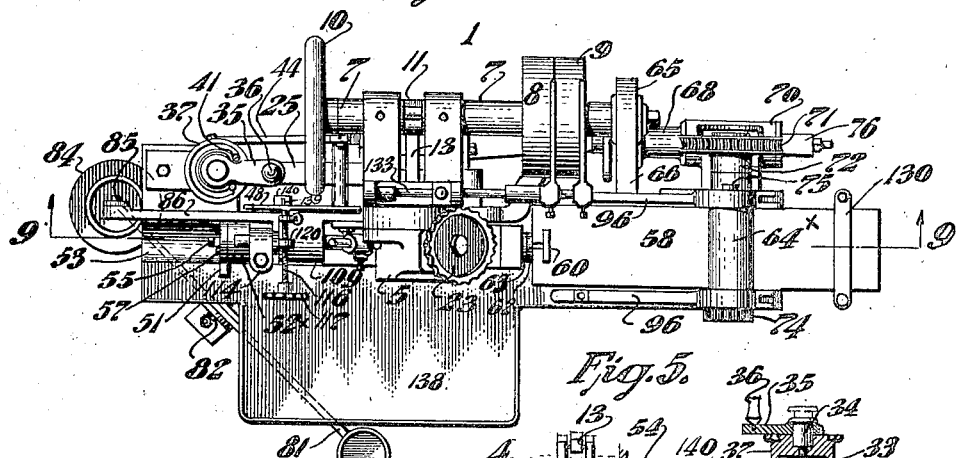
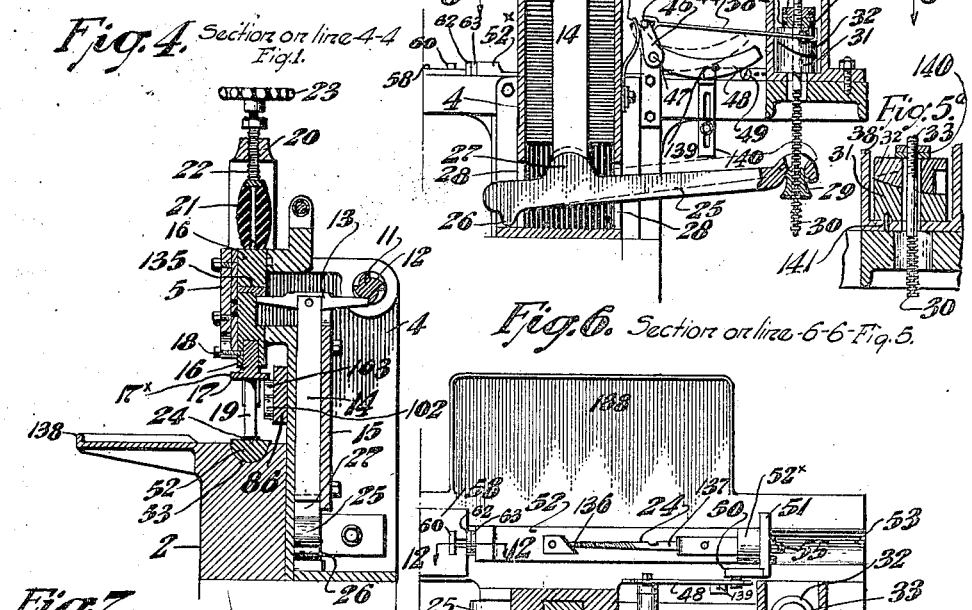
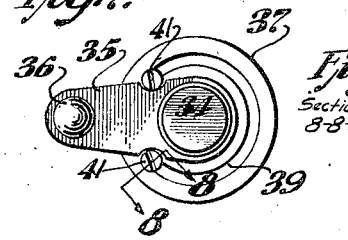
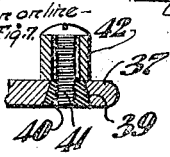
INVENTOR
John A. Hess,
BY
*Niedersheim Fairbanks*
ATTORNEYS Aug. 21, 1923.
J. A. HESS
1,465,434
FILE CUTTING MACHINE
Filed April 22, 1921     5 Sheets-Sheet 4
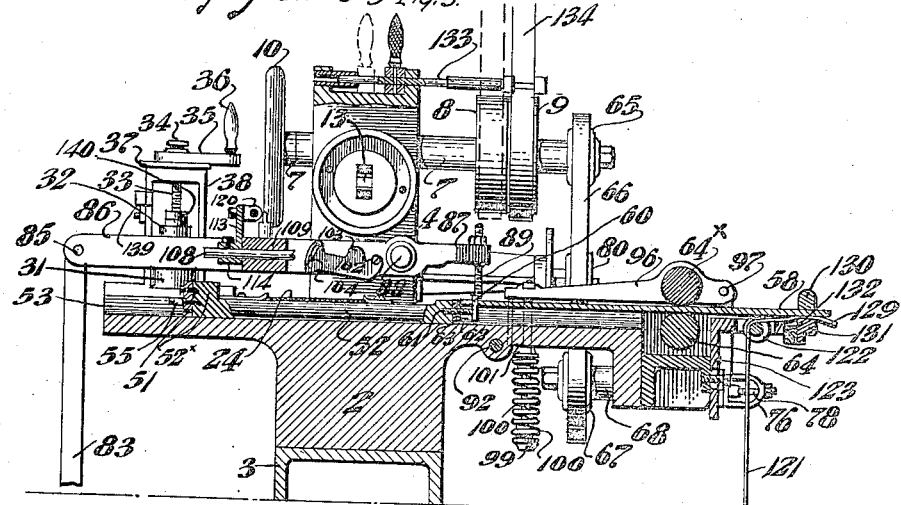
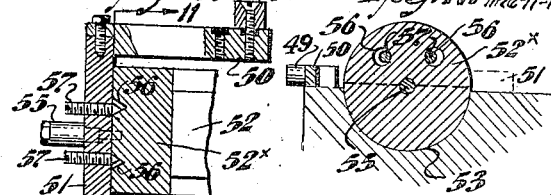
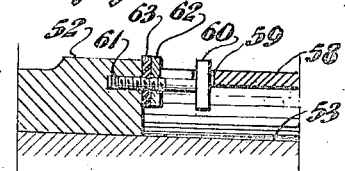
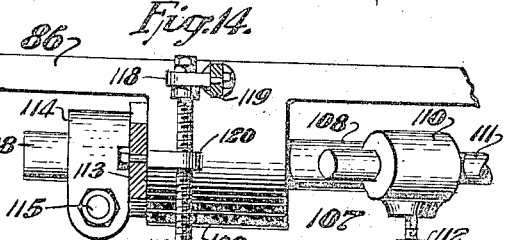
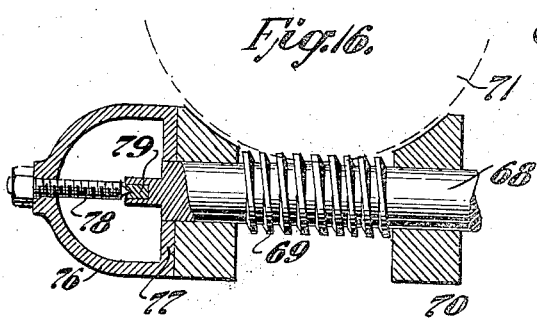
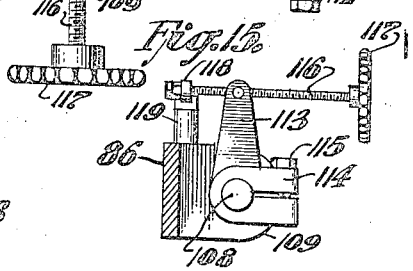
INVENTOR
John A. Hess.
BY
ATTORNEYS Aug. 21, 1923.
J. A. HESS
1,465,434
FILE CUTTING MACHINE
Filed April 22, 1921
5 Sheets-Sheet 5
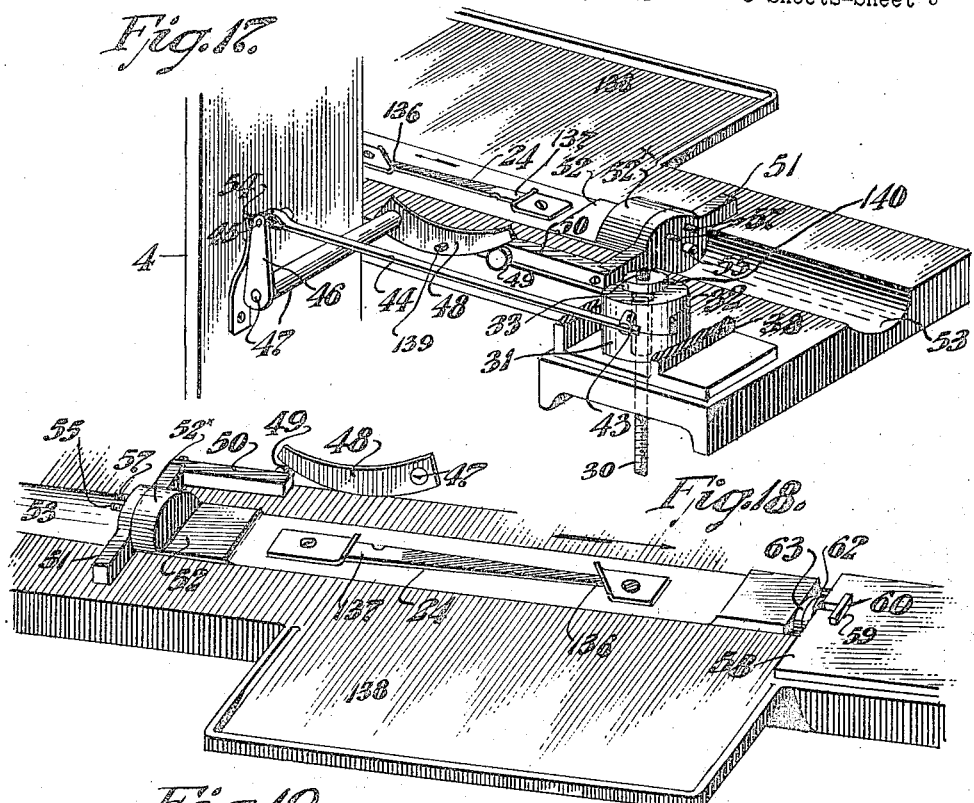
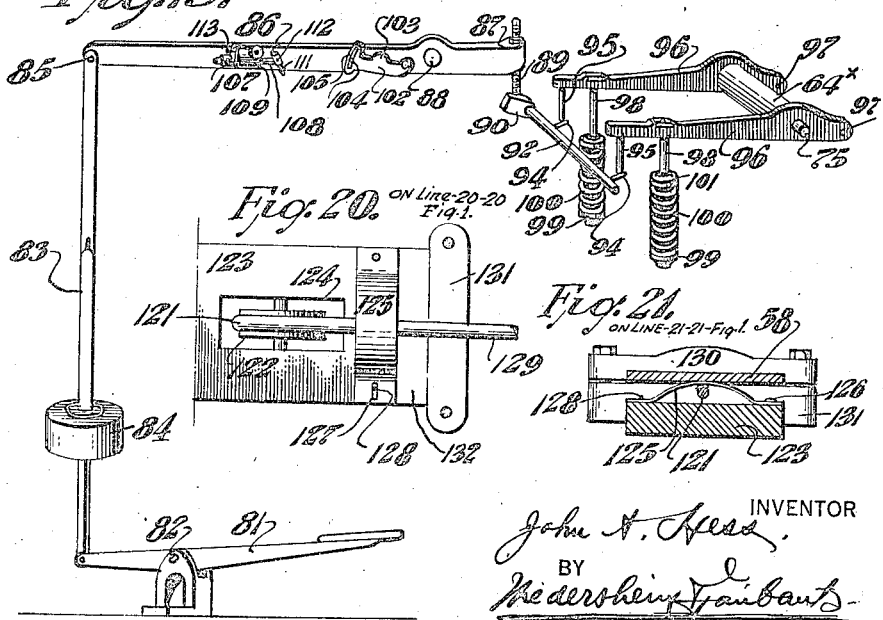
INVENTOR
John A. Hess.
BY
Wiederheim Fairbanks
ATTORNEYS Patented Aug. 21, 1923.

1,465,434

UNITED STATES PATENT OFFICE.

JOHN A. HESS, OF PHILADELPHIA, PENNSYLVANIA.

FILE-CUTTING MACHINE.

Application filed April 22, 1921. Serial No. 463,463.

*To all whom it may concern:*

Be it known that I, JOHN A. HESS, a citizen of the United States, residing in the city and county of Philadelphia, State of Pennsylvania, have invented a new and useful File-Cutting Machine, of which the following is a specification.

My invention consists of a novel construction of a file cutting machine, and comprises various improvements, alterations and novel additions to the structure of the patent of H. A. Foss, No. 319,218, granted June 2nd, 1885, whereby the efficiency and durability of that machine is greatly increased, all as will be hereinafter fully explained and particularly pointed out in the claims.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of a file cutting machine embodying my invention.

Figure 2 represents a back elevation of the same.

Figure 3 represents a top plan view of Figure 1.

Figure 4 represents a section on line 4—4, Figure 1.

Figure 5 represents a vertical sectional view, partly in elevation, of certain portions of the regulating mechanism to be hereinafter referred to. Fig. 5ª represents on an enlarged scale, a vertical section of the cams seen in Fig. 5.

Figure 6 represents a section on line 6—6, Figure 5, certain of the parts being shown in elevation.

Figure 7 represents on an enlarged scale, a plan view of a portion of the adjusting device seen at the right of Figure 5.

Figure 8 represents a section on line 8—8, Fig. 7.

Figure 9 represents a section on line 9—9, Fig. 3, certain of the parts being shown in elevation.

Figure 10 represents a fragmental sectional view of certain portions of the adjusting mechanism seen in Figure 11.

Figure 11 represents a section on line 11—11, Fig. 10.

Fig. 12 represents on an enlarged scale a sectional view on line 12—12, Fig. 6.

Fig. 13 represents on an enlarged scale a section on line 13—13, Figure 1.

Fig. 14 represents a plan view partly in section of certain portions of the adjusting mechanism, to be hereinafter referred to.

Fig. 15 represents on a reduced scale, an end view of Fig. 14.

Fig. 16 represents on an enlarged scale, a side elevation of a worm, the bearings therefor being shown in section.

Figs. 17 and 18 represent on an enlarged scale, perspective views, of the carriage mechanism and its adjuncts, viewed from different angles.

Fig. 19 represents on an enlarged scale, a perspective view of the treadle mechanism, and its adjuncts.

Fig. 20 represents a section on line 20—20, Fig. 1.

Fig. 21 represents a section on line 21—21, Fig. 1.

Fig. 22 represents a perspective view of the presser foot and its adjuncts.

Similar numerals of reference indicate corresponding parts.

Referring to the drawings:—

1 designates my novel construction of file cutting machine, the same comprising the bed 2 which is supported on the base 3. At the rear of the bed 2 is a frame 4, also secured to the base of said bed, said frame carrying the cutter head 5, which is attached to it by set screws 6 passing through concentric slots in the head and tapped into the frame 4 to allow for the adjustment of the head to any angle required, substantially as seen in the Foss Patent. No. 319,218.

7 designates the driving shaft which has its bearings in the frame 4 and is supplied with a fast and loose pulley 8 and 9 and the hand wheel 10. Secured to or forming part of the shaft 7 is a cam or tappet 11 having a plurality of projections or working faces 12 which are four in the present instance, and which act on one end of the beam 13, which is mounted on the top of an adjustable bar 14, which is adapted to slide in ways formed by the plate 15, whose location will be understood from Figs. 2, 4 and 6. The other or left hand end of the beam 13 rests under the hardened plate 135 in a recess formed in the back of the plunger 16, as will be understood from Figure 4, which slides in the head 5. A chisel holder 17 having a flange 17ˣ is secured to the plunger by a set screw or the like, 18 and the chisel or cutting tool 19 is secured to the holder by another set screw in the usual manner.

Between the plunger 16 and the yoke 20 on the head 5 is a spring or resilient member 21, which may be of rubber and adjusted by means of a screw 22 passing through the yoke 20 and provided with the hand wheel 23, the lower end of said spring 21 bearing on the top of the plunger 16, and the function of said spring being to keep the chisel 19 down on the blank 24, while the tappet or cam member 11 acting on the beam 13 intermittently elevates the holder 17, so that when said beam 13 is released, the resiliency of the spring member 21 drives the chisel 19 down, thus cutting the teeth on the file blank 24. The power of the blow or rather the fall of the chisel 19 is regulated through the medium of a lever 25, see Figs. 1, 2, 4, 5 and 6, said lever being fulcrumed at the point 26 and having the raised portion 27 on which rests the bottom end of the vertical bar 14, as best seen in Figures 4 and 5.

The lever 25 passes through and is guided in the slots 28 and at its outer end has a seat for the nut 29, through which passes the threaded stem 30, which passes through the lower cam member 31, which supports the upper cam member 32, which is engaged by the threaded stem 33, whose upper end terminates in the cylindrical head 34, which is fast to the arm 35 carrying the handle 36, see Figs. 5 and 7, said head 34 being rotatably mounted in the top 37 of the yoke 38. The stem 30 may be secured fast to the cam 32 by any suitable means unnecessary to be described in detail, such as the lock nuts 140 so that said stem and cam move as a unit, as will be understood from Fig. 5ᵃ.

The handle 35 is locked in the desired position by the devices seen in Figures 7 and 8, wherein the top 37 is provided with the annular slot 39, in which are the locking wedges 40, which are engaged by the screws 41, each of which pass through the outer sleeve 42, so that after the arm 35 is set, the tightening of each of the screws 41 will hold said arm 35 stationary or locked in any desired position, the wedges 40, seating upwardly against their bevelled seats, as will be understood from Figure 8.

43 designates a slotted lug projecting from the upper cam member 32, see Figure 17 and having an end of the link 44 pivotally secured therein, the other end of said link being forked and engaging the pin 45 on the rock arm 46, mounted on one end of the rock shaft 47, whose other end has fast thereon the cam 48, whose bottom curved face is actuated by the roller 49, which is rotatably mounted on the bar 50, which is attached to the back plate 51 of the carriage 52 whose bottom is convex and reciprocates in the trough shaped bearing or concavity 53.

54 designates a spring bearing against the rock arm 46 as seen in Figures 2, 5 and 17.

One end portion 52ˣ of the carriage 52 is cylindrical in cross-section as seen in Figures 9, 11, 17 and 18, and the back plate 51 is secured thereto by the central axial fastening 55, so that said carriage can be slightly rotatably adjusted axially, with respect to said plate 51, which is effected by providing two conical seats 56 in the end of said carriage at points above the horizontal diameter of the rear of the carriage, as seen in Figure 11, said seats being engaged by the ends of the screws 57, which are eccentrically positioned with respect to said seats as seen in Figures 10 and 11, so that when said screws are turned, their ends will engage the tapered walls of said seats, as seen in Figure 10, so that a slight axial rotation of the carriage 52 with respect to the relatively stationary back plate 51 is effected, and after the desired rotary or axial adjustment is effected, the central fastening device 55 is tightened, as also the screws 57.

Viewed from the front of the machine, as seen in Figs. 1, 9 and 18, it will be understood that the adjusting devices described in Figures 10 and 11 are at the left hand end of the carriage 52, while at the right hand end of the carriage is located the friction plate 58 best seen in Figures 1, 3 and 12, said plate having the slot 59 therein, through which passes the head 60 of the screw or bolt 61, which latter passes through the metal washer 62 and the rubber washer 63, which are collocated as seen in Figures 12 and 18, so that a solid but cushioned connection is formed between the plate 58 and the carriage 52.

The carriage 52 is actuated by means of the frictional contact of the upper and lower rollers 64ˣ and 64, with the top and bottom of the plate 58, said rollers being actuated as follows:—

The pulley 65 on the shaft 7 drives the belt 66, which drives the lower pulley 67 mounted on the shaft 68 having the worm 69, revolving in the housing 70, said worm meshing with the gear 71 on the lower shaft 72, which carries on its opposite end the pinion 73, which meshes with and drives the pinion 74 on the shaft 75, it being apparent that the friction rollers 64ˣ and 64 rotate in unison with the shafts 72 and 75. Any lost motion or play of the shaft 68 can be taken up by the device seen at the left of Figure 16, comprising the yoke 76, having the base 77, and the screw 78 having its pointed end engaging the hardened bearing 79, seated in the end of the shaft 68, it being apparent that the belt 66 is kept taut by the belt tightener 80.

It is desirable in devices of this character for the contact between the rollers 64× and 64 and the plate 58 to be varied or adjusted according to requirements and in the present instance, I provide the treadle 81 which is fulcrumed at the point 82 and connected to the bottom of the link 83 carrying the weight 84, the upper end of said link 83 being pivotally connected at 85 to the lever 86 which is fulcrumed at the point 88 and at its outer end 87 carries the threaded stem 89, whose lower end is adapted to contact with the tappet or rock arm 90, (see Figs. 2 and 19) secured by the set screw 91 to the shaft 92 which passes through the bed 2, (see Fig. 13).

The shaft 92 at its outer ends has the toes, lugs or pins 94 attached thereto or projecting therefrom, which are adapted to contact with the bottom ends of the vertical pins 95, whose upper ends contact with the under sides of the levers 96, said levers being fulcrumed at the points 97. It will be understood from the plan view in Figure 3, that the levers 96 are located on each side of the plate 58 and that the ends of the upper shaft 75 have their bearings therein, so that it will be apparent that as the inner ends of said levers 96 are raised or lowered by the actuation of the pins 95, which is effected by the actuation of the treadle and the parts 86, 89, 90, 92 and 94, see Fig. 19, the upper roller 64× will be slightly raised from the top of the plate 58 and its frictional contact therewith will be correspondingly adjusted or altered according to requirements by the actuation of the treadle 81.

The proper tension is exerted on the levers 96, by the employment of the pendant rods 98, which depend vertically from the levers 96 and pass through the bed 2, the lower end of each of said rods 98 having a head 99, against the top of which the lower end of the spring 100 abuts, the upper end of said spring contacting with the washer 101 as will be understood from Figs. 1, 2, 9 and 19.

102 designates a lifting lug fastened on the lever 86, said lug being for the purpose of lifting the chisel 19 out of engagement with the file blank 24 which is effected by the humped portion 103 engaging the flange 17× of the holder 17, as seen in Fig. 4, said lifting lug 102 being adjusted according to requirements as is evident, through the cap screw 104 working in the slot 105 (see Fig. 19).

107 designates an adjustable presser foot and its adjuncts for the file blank 24 which is used for the purpose of pressing the bottom of the file blank rigidly against the upper face of the carriage 52, so as to enable an even cut to be made on said blank and comprises a shaft 108 mounted in the lug 109, said shaft having at one end a head 110 thereon for retaining the presser foot 111, the set screw 112 being in engagement with the stem of said presser foot, (see Fig. 14).

113 designates a rocker arm having a split lug 114 thereon, said arm and lug being preferably integral and said lug being mounted on the shaft 108 and having the bolt 115 passing through it, so that the tightening of said bolt clamps the split portions of said lug on said shaft 108.

116 designates a threaded rod or stem, which has at one end a hand wheel 117. 118 designates a pivotal lug, which is mounted in the bracket 119, which forms the fulcrum for the rod 116, said rod having thereon a lug 120 which is pivotally mounted in rock arm 113. Through the rotation of the hand wheel 117 and the rod 116, pivotally mounted upon the bracket 119, I am enabled slightly to swing the rocker arm 113 by means of the lug 120 and thus adjust the presser foot 111 to its proper position in relation to the file blank 24.

The weight 106 is suspended from the connection 121, whose upper end passes over the roller 122, which is journalled in the bracket 123 having the top slot 124 therein, said upper end passing under the bowed spring 125, one of whose ends is secured to the bracket 123, as at 126, the other end of said spring having a slot 127 therein, through which passes the pin 128, as seen in Fig. 20. The top of the spring 125 contacts with the bottom of the plate 58 (see Fig. 21) and tends to keep said plate in a horizontal or rectilinear condition or position with respect to the rollers 64× and 64, the carriage 52 and its track or ways 53. The free end 129 of the connection 121 is clamped against the bottom of the plate 58 by the upper and lower jaws 130 and 131, this being apparent from Figs. 9, 20 and 21, it being apparent that the function of the weight 106 is to cause the carriage 52 and its adjuncts to move from right to left, when the operator is facing the machine as in Figures 1, 3 and 9, upon the separation of the rollers 64× and 64, any shock or jar being taken up by the rubber bumper 132, seen in Fig. 9.

The operation is as follows:—

By the belt shifter 133, the main driving belt 134 is shifted to the tight pulley 8, thereby rotating the shaft 7, which in turn actuates the pulleys 65 and 67 through the belt 66. The pulley 67 being mounted on the shaft 68 rotates it and also the worm 69, said worm imparting rotation to the gear 71 together with the lower friction roller 64, and the lower shaft 72. The pinion 73 mounted on the shaft 72, meshes with the upper pinion 74 of the shaft 75, said shaft also carrying the upper friction roller 64$^x$ and said friction rollers 64$^x$ and 64 being in contact with the plate 58, actuate the latter together with the carriage 52 in a right hand direction assuming the operator to be standing at the front of Fig. 1 and that said carriage and plate are in the position seen therein. The shaft 7 simultaneously rotates the cam 11, which in turn actuates the beam 13, said beam being constantly in contact with the tappet or hardened plate 135 of the holder 16, see Fig. 4, thus imparting reciprocatory motion to said holder 16, this upward reciprocatory motion of said holder being against the tension of the rubber spring 21, thus giving a forcible, but accurate blow to the chisel 19. During the reciprocations of the chisel, the carriage 52 carrying the blank 24 and the plate 58 travels from left to right of the position seen in Fig. 1 through the action of the friction rollers 64$^x$ and 64. The plate 51, which is secured to the head 52$^x$ of the bed 52, carries the arm 50, which has mounted on it the roller 49, which actuates the cam 48, which rocks the shaft 47 which in turn actuates the rock arm 46.

The rod 44 being pivotally connected at the points 54 and 43, is actuated by the rock arm 46 and rotates the upper cam 32 on the lower stationary cam 31, and thus lifts the threaded rod 30, whose upper end passes freely through said stationary cam 31 and is secured in the upper movable cam, as seen in Fig. 5$^a$.

The lever 25 which is mechanically connected to the lower end of the threaded rod 30 is also gradually lifted, together with the upright member 14, during the travel of the plate 58 and carriage 52 to the right. The beam 13 is simultaneously gradually lifted at this stage and during its gradual elevation from the positions seen in Figs. 4 and 5 lengthens the stroke of the chisel.

The action is automatic as is evident, and this feature of gradually lengthening the stroke of the chisel upon the file blank is necessary because said blank, as seen in Figs. 17 and 18 gradually increases in width from the butt 136 to the tang 137, and consequently the resistance becomes greater and increases at each stroke of the chisel, so that to maintain an even and uniform cut upon the file blank, the force of the blow or length of the stroke of the chisel must be gradually increased accordingly.

The contour or curve of the bottom curved wall of the cam 48 is designed so as to provide or compensate for the gradual increase in width of the file blank, and by its coaction with the parts seen in Figs. 4, 5, 5$^a$, 17 18, an efficient and accurate automatic device is provided, which requires no attention on the part of the operator, the desired adjustment of the cams 32 and 31 having been first made by the mechanism seen in Figs. 5, 5$^a$, 7 and 8.

When the file blank 24 has been cut and finished, the operator depresses the treadle 81, thus lifting the presser foot 111 from the file through the motion of the link 83 and the lever 86. At this point the chisel becomes disengaged from the file also, through the humped portion 103 of the member 102 rising and coming in contact with the flange 17$^x$ of the chisel, see Figures 1, 4, 9, and 19. The lever 86 pivoted at 88 moves the threaded rod 89 downwardly to engage the tappet 90, which is mounted on the shaft 92, and rocks the same, which in turn lifts the arms 96 by the lifting toes 94 engaging with the pins 95, which are elevated against the tension of the springs 100. This raising of the arms 96 lifts the friction roller 64$^x$ out of engagement with the plate 58, and in so doing the weight 106 drops downwardly thus bringing the carriage 52 and plate 58 and their adjuncts back into their initial position, seen in Fig. 1 and ready for another file blank.

The table or shelf 138 forms a convenient receptacle for the file blanks. In Figs. 5 and 17, I have shown a pin 139, attached to the cam 48 and in alignment with the top of the slotted gage 140, seen in Fig. 5, said slot having a bolt passing therethrough, whereby by adjusting said gauge vertically, against said pin, the initial position of the cam 48 can be readily assured.

It will be seen from the right of Figure 9, that when the carriage 52 and plate 58 and their adjuncts are returned from their extreme right hand position to their normal position seen in Figure 1 or 9, any shock or jar is taken up by the rubber bumper 132 seen at the right of said Figure 9.

It will further be apparent from Figure 12 that by reason of the connections, 61, 63 and 62 seen therein that the plate 58 is rigidly but somewhat yieldingly secured to the carriage 52 by the cushioned connection 63 seen therein.

It will further be apparent from Figures 10 and 11 that any desired adjustment between the parts 51 and 52 and their adjuncts can be readily effected by the manipulation of the screws 57 and 55. It will be further seen that by the employment of the friction feed rollers 64 and 64$^x$, the same will continuously draw the plate 58 and the carriage 52 forwardly so that the teeth of the file will be cut accurately and truly since when the chisel comes in contact with the face of the file blank, the latter will be momentarily retained thereby, being allowed to move forwardly again, the instant the chisel rises, this momentary retention being permitted by the slight slip of said plate 58 with respect to the continuously rotating friction rollers 64 and 64ˣ.

It will be seen from the foregoing that my invention is differentiated from the Foss patent aforesaid, since I dispense with the manual operation of the handle 36 and employ in lieu thereof the automatic elements seen in Figures 5, 5ᵃ, 17 and 18, whereby the control of the stroke of the chisel 19 is automatically effected without any attention on the part of the operator.

Another novel feature of my invention is the employment of the device seen in Figures 7 and 8 for effecting the desired adjustment and locking of the handle 36 and its adjuncts in the desired position, while one size of file blanks are being cut.

It will also be apparent from Figures 7 and 8 that upon the loosening of the screws 41, the arm 35 can be rotated to the desired extent, thereby effecting the desired rotation or adjustment of the cam 32, the stem 30 and its adjuncts with respect to each other, and after the arm 35 is set in the desired position, it will be apparent that the screws 41 when tightened will lock the same in the desired position.

The adjustment of the presser foot 111 and its adjuncts for the purpose of retaining the file blank rigid upon the top of the carriage 52 during the file cutting operations, as seen particularly in Figures 14 and 15, and 22 is another novel feature of my invention.

Another novel feature of my invention is the feature seen in Figures 10 and 11 already referred to whereby the carriage 52 can be slightly axially rotated or adjusted, so as to properly position the top face of the file blank with respect to the chisel.

Another novel feature is shown in Figure 16, whereby lost motion is eliminated by means of the yoke 76, the screw 78 and their adjuncts, since it is desirable that there be no lost motion between the worm 69 and the gear 71, as is evident.

Another novel feature of my invention is the employment of the flange 17ˣ seen in Figure 4 and its collocation with respect to the humped portion 103 of the element 102, whereby the raising of the lever 86 automatically raises the chisel out of engagement from the blank.

Other novel features are seen in Figure 19 comprising the threaded rod 89, the tappet 90, the rock shaft 92, the toes 94 and the pins 95 which act through the arms 96 to elevate or disengage the upper friction roller 64ˣ from the plate 58, these being features of great practical value in this art.

It will be further seen that by the employment of the spiral springs 100, I am able to dispense with the rubber bumpers seen in the Foss patent.

It will be understood that in the various illustrations of my invention I have purposely omitted for the sake of clearness of illustration in certain of the views, certain features which I have shown in other views of the drawings and will be apparent that in the manufacture of my invention slight changes may be made by those skilled in the art in the matter of assembling, collocating and positioning various of the mechanical elements without departing from the spirit of my invention.

It will be understood from Figs. 5ᵃ and 17, that the stems 33 and 30 are preferably continuous or integral, and that while the upper cam 32 is free to rotate on said stem 30 or its upper extension 33, it is secured fast to said extension by the lock nuts 140. The lower cam 31 is secured to the bottom of the yoke 38 by means of the pin 141, seen in Fig. 5ᵃ. On the outer portion of the yoke 38, see Figs. 1, 2 and 9, I locate an adjustable stop 139, whose function is to arrest the upward movement of the lever 86 at the desired point in order to protect the rubber spring 21 from undue compression.

It will now be apparent that I have devised a novel and useful file cutting machine which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a machine of the character stated, a chisel, a carriage below said chisel, means for actuating said carriage, a roller carried by said carriage, a cam actuated by said roller, a rock shaft carrying said cam, a lever, actuated by said rock shaft, a plurality of cams, superposed on each other, connections from one of said cams to said lever, an upright bar actuated by said lever, a beam carried by said bar, means for actuating said beam, and connections from said beam to said chisel.

2. In a machine of the character stated, a chisel, a carriage below said chisel, means for actuating said carriage, a roller carried by said carriage, a cam, actuated by said roller, a rock shaft carrying said cam, a plurality of cams, superposed on each other, a lever actuated by said rock shaft, connections from the upper cam to said lever, an upright bar actuated by said lever, a beam carried by said bar, means for actuating said beam, and connections from said beam to said chisel, in combination with manual mean for rotatably adjusting one of said superposed cams, and locking devices for said manual means.

3. In a machine of the character stated, a yoke, a pair of superposed cams therein, having contiguous inclined cam faces, means for rotating the upper of said cams, a carriage for the file blank, means for actuating said carriage, connections common to said carriage and one of said cams for rotating the latter, a chisel, chisel operating means and connections to said chisel operating means for automatically varying the stroke of said chisel.

4. In a machine of the character stated, a yoke, a pair of superposed cams therein having contiguous inclined cam faces, means for rotating the upper of said cams, a threaded stem depending from said upper cam and passing through said lower cam, a carriage for the file blank, means for actuating said carriage, connections common to said carriage and said upper cam for actuating the latter as said carriage progresses, a chisel, chisel operating means and adjustable connections to said chisel operating means for automatically varying the stroke of said chisel.

5. In a machine of the character stated, a carriage for a file blank, a plate attached to an end thereof, a fastening device for said plate located axially of said carriage, and adjusting screws in said plate, having conical ends for adjusting said carriage.

6. In a machine of the character stated, a carriage for a file blank, means for operating said carriage, a chisel holder having a flange thereon, a foot treadle, a level actuated thereby and a cam on said lever below said flange and adapted to raise the latter, when said treadle is actuated.

7. In a machine of the character stated, a carriage for a file blank, means for operating said carriage, a chisel holder having a flange thereon, a chisel in said holder a foot treadle, a lever actuated thereby, and an adjustable pivotally mounted cam on said lever, positioned under said flange and adapted to raise said flange and chisel out of engagement with said blank, when said treadle is actuated.

8. In a machine of the character stated, foot treadle, a lever actuated thereby, a presser foot carried on said lever, and means on said lever for rotatably and laterally adjusting said presser foot with respect to a file blank.

9. In a machine of the character stated, a chisel holder, a chisel therein, a carriage for the file blank, means for actuating said carriage, a beam for reciprocating said chisel holder, means for actuating said beam, a vertical bar, in the upper end of which said beam is supported, and means actuated by the progression of said carriage for automatically gradually elevating said bar and beam and thus automatically varying the length of stroke of said chisel holder.

10. In a machine of the character stated, a chisel holder, a chisel therein, a carriage for the file blank, means for actuating said carriage, a beam for actuating said chisel holder, a vertical bar in whose top said beam is supported, a lever on which the bottom end of said bar is supported and means automatically operated by the progression of said carriage for gradually raising said lever, bar and beam, whereby the length of stroke of said chisel holder is automatically varied during the progression of said carriage.

11. In a machine of the character stated, a carriage for a file blank, means for actuating said carriage, a plate secured to the end of said carriage, means for effecting relative adjustment of said plate and carriage, a roller supported from said plate, a cam having a curved bottom surface contacting with said roller, a rock shaft carrying said cam, a rock arm in the other end of said rock shaft, a spring bearing on said rock arm, a chisel holder, means for actuating the latter, and connections intermediate said rock arm and chisel holder for automatically varying the stroke of the latter during the progression of said carriage.

12. In a machine of the character stated, a chisel holder, means for actuating it, a carriage for a file blank, means for actuating said carriage, a yoke having a pair of cams therein superposed on each other, and having inclined contiguous cam faces, means for rotatably adjusting one of said cams, devices for locking said cam adjusting means, connections intermediate said carriage for actuating one of said cams, and connections intermediate said latter cam and said chisel holder for automatically varying its stroke during the progression of said carriage.

13. In a machine of the character stated, a yoke, a pair of cams superposed on each other and having contiguous inclined cam faces, a stem connected with one of said cams for rotating it, an arm connected with said stem, an annular slot in the top of said yoke, and having converging walls, sleeves on each side of said handle, screws passing through said sleeves and wedges in said slot engaged by said screws for locking said sleeves and arm in the desired position.

14. In a machine of the character stated, a carriage, a plate attached thereto, friction rolls above and below said plate, means for actuating said friction rolls, an upper pair of levers in which said upper roll is journalled, tension devices for exerting a downward pull on each of said levers, upright pins engaging the bottoms of said levers, a foot treadle and connections from said foot treadle to the bottom ends of said pins, whereby said pins, arms and upper friction roller are actuated by the actuation of said treadle.

15. In a machine of the character stated, a carriage, a plate attached thereto, friction rolls above and below said plate, means for actuating said friction rolls, an upper pair of levers in which said upper roll is journalled, tension devices for exerting a downward pull on each of said levers and the upper friction roll, upright pins engaging the bottoms of said levers, a foot treadle, a lever actuated thereby, a threaded stem depending from an end of said lever, a horizontal rotatable shaft, having a tappet thereon engaged by said stem, and toes on said tappet in alignment with and adapted to engage the bottom ends of said pins for elevating the latter.

16. In a machine of the character stated, a carriage, a plate in horizontal alignment therewith, and having a slot therein, a bolt having its head projecting through said slot and its opposite end screwed into said carriage, a resilient washer contiguous to said carriage, a metallic washer contiguous to said carriage, a metallic washer next to said resilient washer, said bolt passing through said washers, friction rolls above and below said plate, a pair of levers in which the upper friction roll is journalled, tension devices exerting a downward pull upon said levers, a foot treadle and connections therefrom to the under sides of said levers for simultaneously actuating said levers and upper roll when said treadle is actuated.

17. In a machine of the character stated, a foot treadle, a lever actuated thereby, a presser foot carried by said lever and having means for adjusting it rotatably and longitudinally, a chisel holder having a flange thereon, an adjustable cam pivotally mounted on said lever and positioned below said flange, and adapted to actuate the latter simultaneously with said foot treadle, a vertically adjustable threaded stem carried by said lever, a horizontal rock shaft mounted in the bed of said machine, a tappet on said rock shaft engaged by said stem, toes on said rock shaft, a carriage, a plate attached thereto, friction rolls above and below said plate, and means intermediate said toes and one of said friction rollers for actuating the latter, when said foot treadle is actuated.

18. In a machine of the character stated, a carriage for the file blank, a worm shaft below said carriage, means for driving said worm shaft, a friction plate attached to said carriage, friction rolls for actuating said plate and carriage, a worm on said worm shaft, a worm gear driven by said worm, driving mechanism intermediate said worm gear and friction rolls, bearings for said worm shaft, a yoke engaging one of said bearings, a threaded stem in said yoke, and a hardened block in the end of said worm shaft, against which said threaded stem seats, whereby upon the manipulation of said stem in the proper direction any play between said worm and worm gear can be taken up.

19. In a machine of the character stated, a carriage for the file blank, a friction plate attached to said carriage, friction rolls for actuating said plate and carriage in one direction, a roller under said friction plate, a weighted connection passing over said roller for actuating said plate and carriage in the opposite direction, clamps above and below said friction plate for securing the end of said connection with respect to said plate and a rubber cushion interposed between the lower of said clamps and said machine for taking up the shock of the impact of the returning carriage.

20. In a machine of the character stated, a carriage, a friction plate attached thereto, a bracket below said plate and a bowed spring in contact with the bottom of said plate and having one end fixedly secured to said bracket and its other end movable with respect thereto.

21. In a machine of the character stated, a carriage, a friction plate attached thereto, a bracket below said plate and a bowed spring in contact with the bottom of said plate and having one end fixedly secured to said bracket, its other end movable with respect thereto, in combination with a roller mounted in said bracket, a weighted connection passing over said roller and having its outer end passing under said bowed spring, and clamping devices above and below said plate for fixedly securing the end of said weighted connection with respect to said plate.

22. In a machine of the character stated, the combination of a foot treadle, a lever connected therewith, a slotted cam pivotally mounted on said lever, a chisel holder, a flange thereon, and means for adjusting and locking said slotted cam with respect to said flange and lever.

23. In a machine of the character stated, the combination of a foot treadle, a lever connected therewith, a lug on said lever, a rod passing through said lug, a presser foot carried by said rod, a split lug engaging said rod, a member projecting upwardly from said split lug, and a threaded stem carried thereby, whereby said presser foot can be adjusted with respect to a file blank.

24. In a machine of the character stated, a carriage for the file blank, means for actuating said carriage, a foot treadle, a lever actuated thereby, a rod 108 carried by said lever, a presser foot 111 adjustably mounted with respect to said rod, a split lug 114 mounted on said rod 108, a member 113 projecting from said lug, a threaded ear 120 mounted on said member 113, a threaded stem 116 passing through said ear 120, and a movably mounted member 118, in which the end of said stem is mounted, whereby the desired adjustments can be given to said presser foot.

25. In a machine of the character stated, a chisel holder, having a flange thereon, means for actuating said holder, a carriage for the file blank, a foot treadle, a lever actuated by said foot treadle, an adjustable cam on said lever adapted to actuate said flange and chisel holder and means for adjusting and locking said cam with respect to said lever and flange.

26. In a machine of the character stated, a chisel holder having a flange thereon, means for actuating said holder, a carriage for the file blank, a foot treadle, a lever actuated by said foot treadle, an adjustable cam on said lever adapted to actuate said flange and chisel holder and means for adjusting and locking said cam with respect to said lever and flange, in connection with a presser foot also carried by said lever means for adjusting said presser foot.

JOHN A. HESS.

Witnesses:
E. HAYWARD FAIRBANKS,
C. D. McVAY.